United States Patent
Danielsen et al.

(10) Patent No.: US 11,845,138 B2
(45) Date of Patent: Dec. 19, 2023

(54) SYSTEMS AND METHODS FOR CASE REPAIR

(71) Applicant: Raytheon Technologies Corporation, Farmington, CT (US)

(72) Inventors: Heather Danielsen, Bremerton, WA (US); Norman Gagnon, Rochester, NH (US); George Reynolds, Sanford, ME (US); Kevin Sloan, Portland, ME (US); Keith Pooler, Lebanon, ME (US); Jason Christiansen, Madbury, NH (US); Michael Fischer, Somersworth, NH (US)

(73) Assignee: RTX CORPORATION, Farmington, CT (US)

( * ) Notice: Subject to any disclaimer, the term of this patent is extended or adjusted under 35 U.S.C. 154(b) by 311 days.

(21) Appl. No.: 17/189,809

(22) Filed: Mar. 2, 2021

(65) Prior Publication Data
US 2022/0281025 A1    Sep. 8, 2022

(51) Int. Cl.
| | |
|---|---|
| *B23K 10/02* | (2006.01) |
| *B23P 6/00* | (2006.01) |
| *F01D 5/00* | (2006.01) |
| *B33Y 10/00* | (2015.01) |
| *B33Y 50/02* | (2015.01) |

(Continued)

(52) U.S. Cl.
CPC .......... *B23K 10/027* (2013.01); *B23K 10/006* (2013.01); *B23P 6/007* (2013.01); *B33Y 10/00* (2014.12); *B33Y 50/02* (2014.12); *F01D 5/005* (2013.01); *F01D 25/24* (2013.01); *F05D 2230/312* (2013.01); *F05D 2230/80* (2013.01)

(58) Field of Classification Search
CPC .... F01D 5/005; F01D 25/24; F05D 2230/312; F05D 2230/80; C23C 4/073; C23C 4/134
See application file for complete search history.

(56) References Cited

U.S. PATENT DOCUMENTS

| | | | |
|---|---|---|---|
| 6,605,160 B2 | 8/2003 | Hoskin | |
| 7,685,712 B2 * | 3/2010 | Foucher | B23P 6/007 |
| | | | 29/889.6 |

(Continued)

FOREIGN PATENT DOCUMENTS

| | | |
|---|---|---|
| DE | 102011087665 | 6/2013 |
| EP | 2108787 | 10/2009 |
| EP | 3366883 | 8/2018 |

OTHER PUBLICATIONS

European Patent Office, European Search Report dated Jul. 27, 2022 in Application No. 22158340.4.

*Primary Examiner* — Brian P Wolcott
(74) *Attorney, Agent, or Firm* — Snell & Wilmer L.L.P.

(57) ABSTRACT

A method for repairing a pocket of a case for a variable stator assembly may comprise: receiving, via a processor, a plurality of wear depths, each wear depth in the plurality of wear depths corresponding to a wear portion in a stator pocket in a plurality of stator pockets; determining, via the processor, a plurality of thicknesses of a coating to be deposited based on the plurality of wear depths, each thickness of the coating in the plurality of thicknesses corresponding to the wear portion for each stator pocket in the plurality of stator pockets; and commanding, via the processor, a coating spray torch to deposit the coating in the wear portion of each stator pocket in the plurality of stator pockets.

7 Claims, 7 Drawing Sheets

(51) Int. Cl.
  *B23K 10/00* (2006.01)
  *F01D 25/24* (2006.01)

(56) References Cited

U.S. PATENT DOCUMENTS

| | | | |
|---|---|---|---|
| 7,717,670 | B2 | 5/2010 | Snecma |
| 8,763,403 | B2 * | 7/2014 | Lagasse ............... F01D 5/005 29/800 |
| 9,404,374 | B2 * | 8/2016 | Addis ................ F04D 29/644 |
| 2009/0000101 | A1 * | 1/2009 | Reynolds ............. B23P 6/007 29/402.11 |
| 2016/0010488 | A1 * | 1/2016 | Albers ................. C23C 16/36 427/446 |
| 2016/0281538 | A1 * | 9/2016 | Keltner ................ F01D 25/24 |
| 2017/0122561 | A1 * | 5/2017 | Nagaraj ............. C23C 28/028 |
| 2017/0369981 | A1 * | 12/2017 | Srinivasan ........... C23C 10/48 |
| 2018/0243866 | A1 * | 8/2018 | Srinivasan ............. F01D 9/04 |

* cited by examiner

SYSTEMS AND METHODS FOR CASE REPAIR

FIELD

The present disclosure relates to gas turbine engines, and more specifically, to repair systems and methods for case wear from variable stators of gas turbine engines.

BACKGROUND

Gas turbine engines typically include a compressor section to pressurize inflowing air, a combustor section to burn a fuel in the presence of the pressurized air, and a turbine section to extract energy from the resulting combustion gases. The compressor section typically may comprise alternating rows of rotors and stators, ending with an exit guide vane. The exit guide vane may be angled to remove swirl from the inflowing air, before directing air into a diffuser assembly. The stators of the compressor section may be configured to rotate about an axis of the stator, resulting in wear in a case of the stator assembly.

SUMMARY

A method for repairing a pocket of a case for a variable stator assembly is disclosed herein. The method may comprise: receiving, via a processor, a plurality of wear depths, each wear depth in the plurality of wear depths corresponding to a wear portion in a stator pocket in a plurality of stator pockets; determining, via the processor, a plurality of thicknesses of a coating to be deposited based on the plurality of wear depths, each thickness of the coating in the plurality of thicknesses corresponding to the wear portion for each stator pocket in the plurality of stator pockets; and commanding, via the processor, a coating spray torch to deposit the coating in the wear portion of each stator pocket in the plurality of stator pockets.

In various embodiments, depositing the coating is performed in layers for the wear portion of each stator pocket in the plurality of stator pockets. Commanding the coating spray torch to deposit the coating may further comprise: commanding, via the processor, the coating spray torch to deposit a first layer of the coating in a first pocket in the plurality of stator pockets; commanding, via the processor, a rotatable fixture to rotate the case and align the coating spray torch with a second pocket in the plurality of stator pockets; and commanding, via the processor, the coating spray torch to deposit a second layer of the coating in the second pocket in the plurality of stator pockets. The plurality of wear depths may be received through a gauge. The coating may be a nickel-aluminum plasma coating. The method may further comprise commanding, via the processor, a milling machine to remove a lip at least partially defined by the wear portion of each pocket in the plurality of stator pockets prior to commanding the coating spray torch to deposit the coating. In various embodiments, commanding the milling machine to remove the lip may further comprise machining the lip to a machined depth based on a respective depth in the plurality of wear depths for a respective stator pocket in the plurality of stator pockets. The wear portion of each stator pocket in the plurality of stator pockets may include a recess having an axial portion, a radial portion, and a circumferential portion relative to a centerline defined by an aperture through the stator pocket in the plurality of stator pockets.

A repair method is disclosed herein. The repair method may comprise: removing a lip from a stator pocket of a variable stator case for a gas turbine engine, the lip defined by a gas path surface of the variable stator case, a sidewall of the stator pocket, and a wear surface; depositing a plasma spray coating into a wear recess of the stator pocket via a double-wire feed and plasma arc additive manufacturing process; and machining the stator pocket to a predetermined specification.

In various embodiments, the repair method may further comprise measuring a wear depth of the wear recess prior to removing the lip. The repair method may further comprise removing the lip based on the measured wear depth. The repair method may further comprise depositing the plasma spray coating to a thickness, the thickness determined based on the wear depth of the recess. The repair method may further comprise aligning a coating spray torch with the recess prior to deposing the plasma spray coating into the wear recess. In various embodiments, aligning the coating spray torch may comprise rotating the variable stator case relative to the coating spray torch. The method may further comprise removing a second lip from a second stator pocket of the variable stator case, the second stator pocket disposed adjacent to the stator pocket. The method may further comprise depositing a first layer in the wear recess, and depositing a second layer into a second wear recess of the second stator pocket of the variable stator case.

A control system for repairing a variable stator case of a gas turbine engine is disclosed herein. The control system may comprise: a coating spray torch; a rotatable fixture configured to receive the variable stator case; a controller operably coupled to the coating spray torch and the rotatable fixture, the controller operable to: receive a wear depth for each pocket in a plurality of pockets of the variable stator case; command the rotatable fixture to rotate and align the coating spray torch with a first wear recess of a first pocket in the plurality of pockets; and command the coating spray torch to deposit a first portion of a plasma spray coating into the first wear recess.

In various embodiments, the controller is further operable to: command the rotatable fixture to rotate and align the coating spray torch with a second wear recess of the first pocket in the plurality of pockets; and command the coating spray torch to deposit a second portion of the plasma spray coating into the second wear recess. The controller may be further operable to deposit a plurality of layers in the first wear recess. The controller may be further operable to deposit the plurality of layers to a thickness, the thickness based on the wear depth for the first wear recess.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
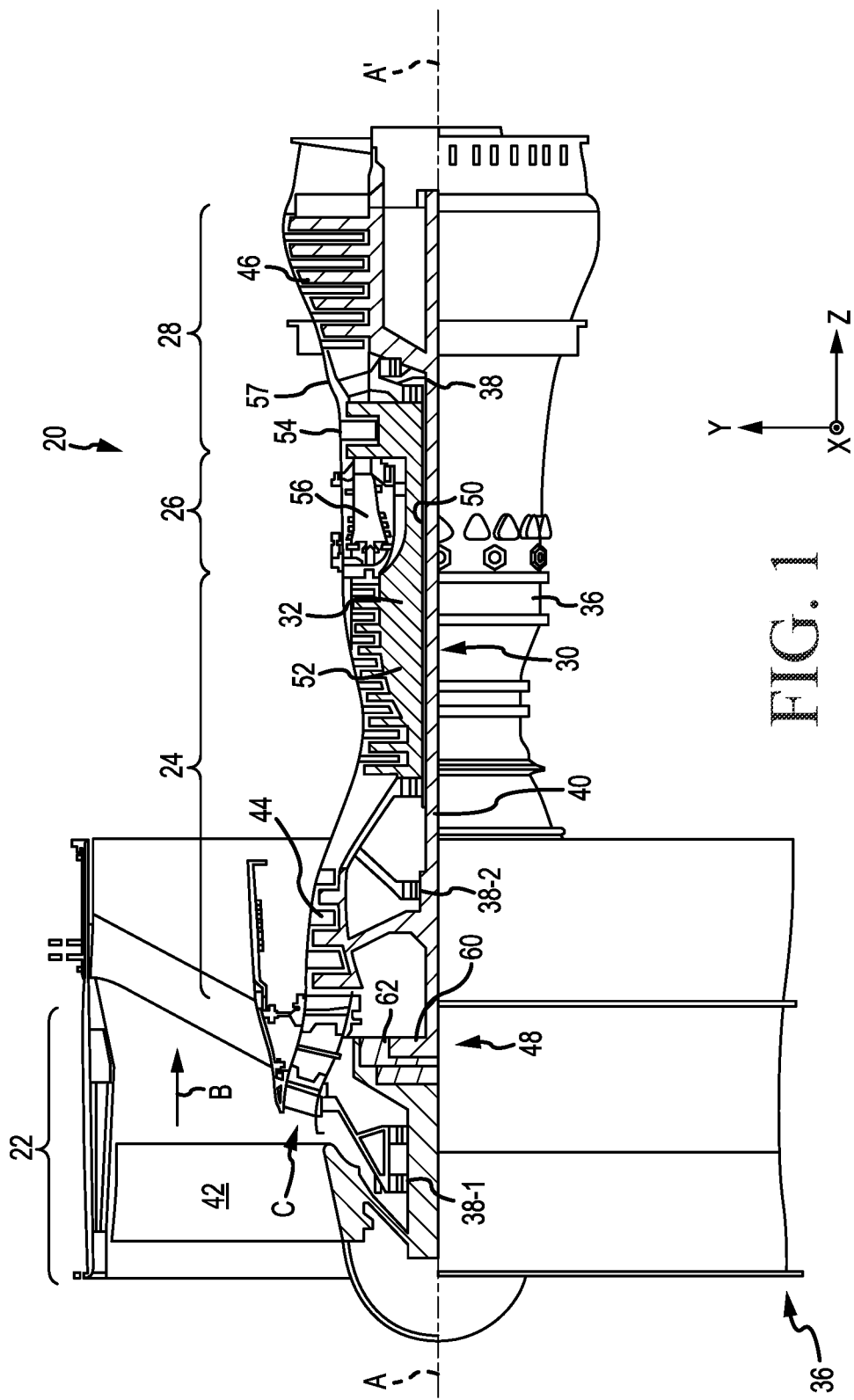
FIG. 1 illustrates a cross-sectional view of an exemplary gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein and unless defined otherwise, "radial" refers to a direction outward from a gas turbine engine centerline, and "axial" refers to a direction from aft to forward or vice versa.

In various embodiments, a system and method of repairing a stator pocket for a gas turbine engine is disclosed herein. In various embodiments, the method may comprise mask unworn portions of the stator pocket, grit blast and spray the worn portion with nickel coating using dual wire arc methods on the worn stator pockets, and then machining the stator pocket to a predetermined blueprint, in accordance with various embodiments. Typically, nickel coating is used on flat and full-hoop circumferential surfaces (i.e., simpler geometry flat planar and flat annular surface) with line-of-site spray access for dimensional restoration. In various embodiments, each stator pocket in the plurality of stator pockets 320 includes a counterbore which comprises an aperture 322 and a pocket recess 324. Nickel coating is not usually used on complex geometry such as the counterbores. The use of nickel coating, in accordance with the systems and methods disclosed herein, is not for the material properties, such as using a weld would be. Instead, the systems and methods of the present disclosure are purely for a dimensional restoration of the flowpath. In various embodiments, the repair method and system disclosed herein include repairing the stator back to a predetermined specification without welding, pre-machining, or local fabrication details. In various embodiments, the worn areas may be restored back to the predetermined specification with minimal operation steps relative to typical repair methods to properly restore a gas path surface.

The wear depth may vary from stator pocket to stator pocket. The size of the counterbore for a respective stator pocket may be relatively small, which would likely prevent one skilled in the art from pursuing nickel coatings as described herein. The number of locations of wear may be several per vane assembly being repaired. In various embodiments, by having almost every stator pocket as having variable, and complex shapes, and an angle of the wear providing potential line of sight issues, using nickel coating as the solution is unique, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive coolant (e.g., air) along a path of bypass airflow B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine 20 may comprise an industrial gas turbine (IGT) or a geared aircraft engine, such as a geared turbofan, or non-geared aircraft engine, such as a turbofan, or may comprise any gas turbine engine as desired.

Figure 2:
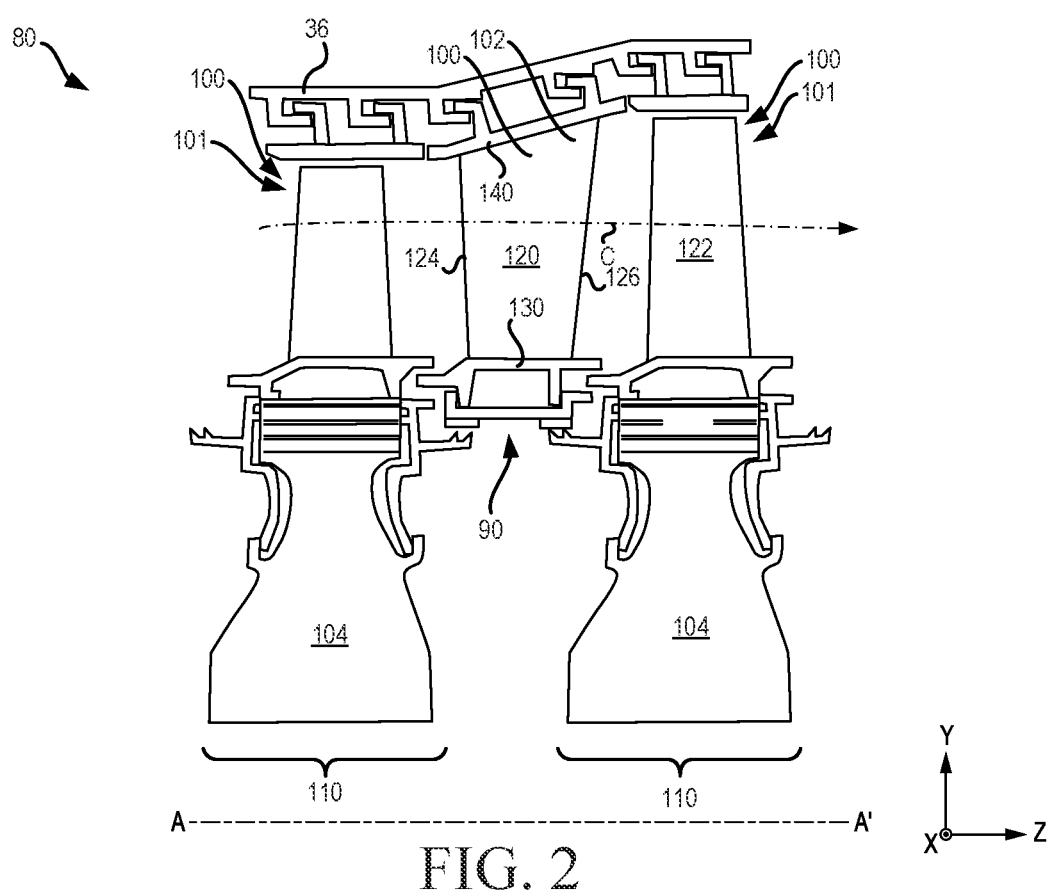
FIG. 2 illustrates a cross-sectional view of an engine section of gas turbine engine, according to various embodiments.

Referring now to FIG. 2 and still to FIG. 1, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'.

In various embodiments, compressor stages and/or turbine stages may comprise multiple interspersed stages of blades and vanes. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'.

With continued reference to FIG. 2 schematically shows, by example, a portion of an engine section 80 with variable vanes 102, which is illustrated as a compressor section 24 of gas turbine engine 20. It will be understood that the repair systems and methods disclosed herein may be applicable to any variable vane assembly (e.g., an assembly with a variable vane 102).

Engine section 80 may include alternating rows of blades 101 and vanes 102 comprising airfoils 100 that extend into the core flow path C. For example, the rotor assemblies 110 can carry a plurality of rotating blades 101, while each vane assembly can carry a plurality of vanes 102 that extend into the core flow path C. Blades 101 create or extract energy (in the form of pressure) from the core airflow that is communicated through the gas turbine engine 20 along the core flow path C. Vanes 102 direct the core airflow to the blades 101 to either add or extract energy. Vanes 102 may be arranged circumferentially about engine central longitudinal axis A-A'. In various embodiments, a set of blades 101 may be coupled about a circumference of a generally circular disk 104, which may be disposed radially inward of core flow path C. Disk 104 with blades 101 may comprise a rotor assembly 110 configured to rotate about engine central longitudinal axis A-A'. Blades 101 and vanes 102 may generally be referred to as airfoils 100.

Vane 102 has an airfoil body 120 having a leading edge 124 facing a forward direction in the gas turbine engine 20 and a trailing edge 126 facing an aft direction. An airfoil 100 may include a pressure side wall (i.e. having a generally concave surface) and a suction side wall (i.e. having a generally convex surface) joined together at the respective leading edge 124 and trailing edge 126. Each vane 102 may include an inner diameter (ID) case 130 at an inner diameter end of the airfoil body 120 and an outer diameter (OD) case 140 disposed at an OD end of the airfoil body 120. For example, the airfoil body 120 may extend radially outward from ID case 130 at the inner diameter end of the airfoil body 120 to the OD case 140 at the outer diameter end of the airfoil body 120.

In various embodiments, vane 102 is a variable vane. A "variable vane" as defined herein, refers to a vane 102 configured to rotate about a vane axis defined through the airfoil body 120 of the vane 102. In this regard, the vane 102 may be configured to vary an angle of attack of the airfoil body 120, in accordance with various embodiments. In various embodiments, in response to varying the angle of attack of the airfoil body 120, a pocket disposed in the OD case 140 may wear over time. In various embodiments, the wear may be circumferential in nature and vary across pockets adjacent to respective vanes within a stator assembly 90.

Figure 3A:
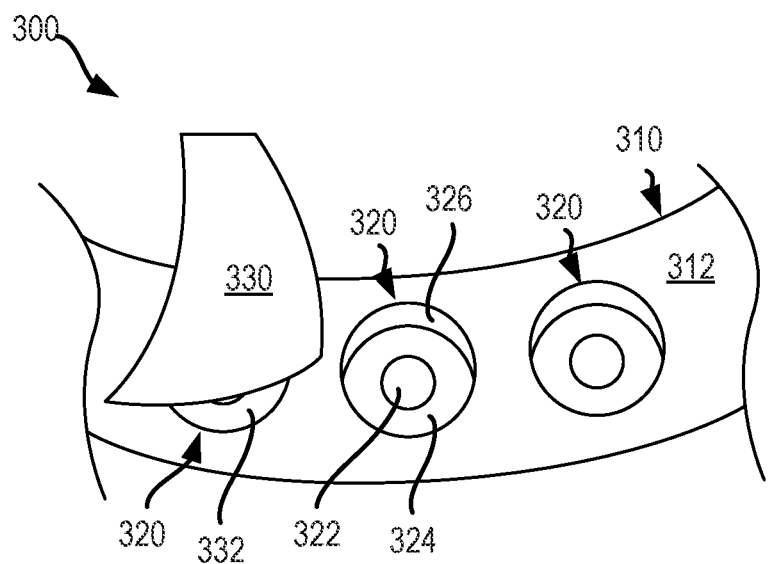
FIG. 3A illustrates a portion of a stator assembly, in accordance with various embodiments.

Referring now to FIG. 3A, a portion of a stator assembly 300 is illustrated in a partially radial direction (i.e., at an angle about an engine centerline), in accordance with various embodiments. The stator assembly 300 may be in accordance with stator assembly 90 from FIG. 2. The stator assembly 300 may include a compressor case 310 having a gas path surface 312. Although described herein as including a compressor case 310, any case having a gas path surface 312 effected due to wear is within the scope of this disclosure. For example, a turbine case experiencing wear may utilize the repair systems and methods disclosed herein, in accordance with various embodiments. In various embodiments, a gas path surface (e.g., gas path surface 312) is on an OD case (e.g., OD case 140 of FIG. 2) and an ID case (e.g., ID case 130). Thus, in various embodiments, the gas path surface 312 of stator assembly 90 may be a radially inner surface of the compressor case 310 in response to the compressor case 310 being the OD case, and the gas path surface 312 of the stator assembly 90 may be a radially outer surface of the compressor case 310 in response to the compressor case 310 being an ID case. In various embodiments, the OD case 140 and/or the ID case 130 of stator assembly 90 from FIG. 2 may be in accordance with the compressor case 310. In various embodiments, only the OD case 140 from FIG. 2 is in accordance with compressor case 310.

In various embodiments, the compressor case 310 comprises a plurality of stator pockets 320 disposed in through the gas path surface 312 and into the compressor case 310. In various embodiments, each stator pocket in the plurality of stator pockets 320 includes a counterbore (i.e., an aperture 322 and a pocket recess 324). In various embodiments, the aperture 322 is configured to receive a shaft therethrough and the pocket recess 324 of each stator pocket in the plurality of stator pockets 320 is configured to interface with a mating portion 332 of a variable vane 330 of the stator assembly 90. During operation of the variable stator over time, a pocket sidewall 326 of each stator pocket in the plurality of stator pockets 320 may wear to some extent. After a number of engine cycles for a gas turbine engine (e.g., gas turbine engine 20 from FIG. 1) a portion of stator pockets in the plurality of stator pockets 320 may be repaired by a method and system disclosed herein.

Figure 3B:
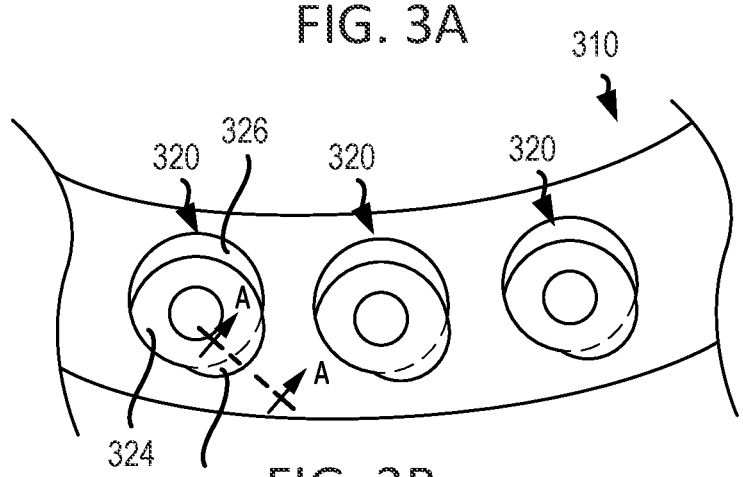
FIG. 3B illustrates a case of a stator assembly after use in various gas turbine engine cycles, in accordance with various embodiments.

For example, with reference now to FIG. 3B, the compressor case 310 after numerous cycles of gas turbine engine 20 from FIG. 1 is illustrated, in accordance with various embodiments. FIG. 3B includes the variable vanes (e.g., variable vane 330 from FIG. 3A) removed for clarity. In response to operation over time, the pocket sidewall 326 of each stator pocket in the plurality of stator pockets 320 may wear, creating a wear portion 328 for each stator pocket in the plurality of stator pockets 320. In various embodiments, the wear portion 328 may be in a circumferential direction in pocket sidewall 326 and be disposed in a portion of the pocket sidewall 326 of a respective stator pocket in the plurality of stator pockets 320.

Figure 3C:
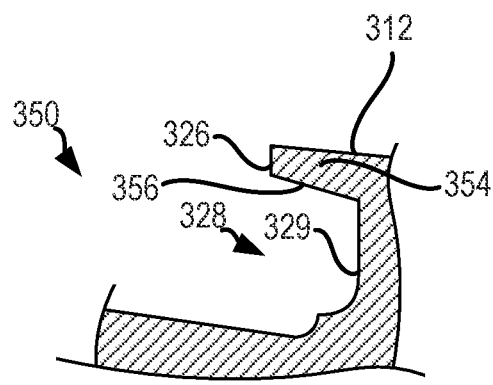
FIG. 3C illustrates a case of a stator assembly after use in various gas turbine engine cycles, in accordance with various embodiments.

Referring now to FIG. 3C, a cross-sectional view along section line A-A of a stator pocket 350 in the plurality of stator pockets 320 from FIGS. 3A-B with a wear portion 328 is illustrated from FIG. 3B is illustrated, in accordance with various embodiments. The gas path surface 312 is disposed opposite a non-gas path surface in a radial direction. In various embodiments, the wear portion 328 is a recess 329 disposed in a pocket sidewall 326 of stator pocket 350 in the plurality of stator pockets 320 from FIGS. 3A-B in a radially outward direction from a central axis defined by a respective aperture 322 (as shown in FIGS. 3A-3B) of stator pocket 350. In various embodiments, the recess 329 defined by the wear portion 328 may have a complex geometry (i.e., having a radial portion, an axial portion, and a tangential portion relative to the central axis defined by the respective aperture 322 (as shown in FIGS. 3A-3B).

In various embodiments, the stator pocket 350 with the wear portion 328 of FIG. 3C may result in increased drag and efficiency loss for a stator assembly relative to a stator assembly prior to operation (e.g., as shown in FIG. 3A). The efficiency may be lost due to air flow through the wear portion 328 instead of through the engine section (e.g., engine section 80 from FIG. 2). In addition, misalignment of the variable vane (e.g., variable vane 330 from FIG. 3A) may cause added allowable variation of the mating portion 332 of variable vane 330 from FIG. 3A in the stator pocket 350. In this regard, the variable vane 330 may tip and cause the air to not hit the next blade (e.g., an aft blade 101 of stator 102 in FIG. 2) at an intended angle, resulting in aerodynamic loss of compressor efficiency relative to a stator assembly without wear portion 328. In various embodiments, the added variability in the aperture (e.g., aperture 322 from FIGS. 3A-3B) where the variable vane (e.g., variable vane 330 from FIG. 3A) are aligned and held in place reduces the rotation accuracy of the variable vane 330 about the central axis of the aperture 322, also reducing efficiency and increasing leakage from the gas path surface 312.

In various embodiments, the wear portion 328 may include a lip 354 defined by the gas path surface 312, pocket sidewall 326 and a first wear surface 356 disposed radially adjacent the gas path surface 312.

Figure 4:
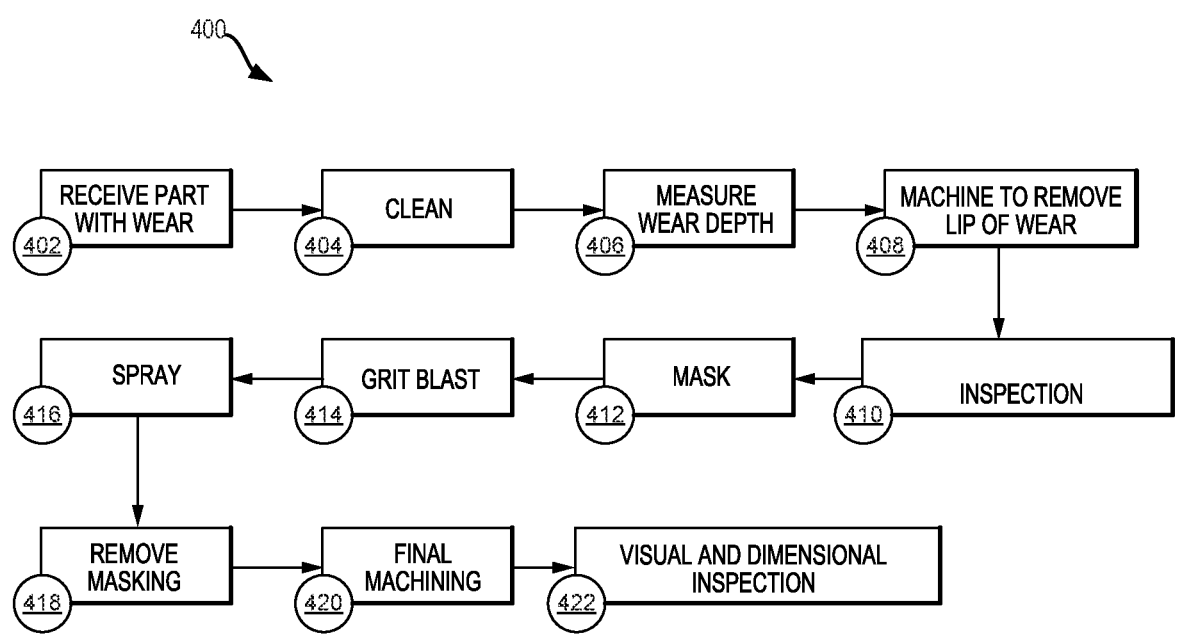
FIG. 4 illustrates a repair process for a case of a variable stator, in accordance with various embodiments.

Referring now to FIG. 4, a repair process 400 for repairing a plurality of stator pockets of a case for a variable stator assembly is illustrated, in accordance with various embodiments. The repair process 400 may include receiving the case (step 402) and cleaning the case (step 404). The case may be in accordance with stator assembly 300 as illustrated in FIGS. 3B and 3C (i.e., after numerous cycles of engine operation with wear portions in each stator pocket of the plurality of stator pockets 320 from FIGS. 3B and 3C).

The repair process 400 may further comprise measuring a wear depth for the wear portion of each pocket in the plurality of stator pockets (step 406). In various embodiments, the wear depth measurement may be sent to a controller for a repair system, in accordance with various embodiments. For example, a wear depth may be measured for each pocket via a dimensional measurement gauge. The dimensional measurement gage may be in communication with a controller of the repair system (e.g., via a network connection, a hardwire connection, or the like). In various embodiments, in response to receiving the wear depth of a specific pocket in the plurality of pockets, the controller may associate the wear depth with the specific pocket for the repair process. For example, the wear depth of each pocket in the plurality of pockets may be measured in a predetermined order, then the plurality of pockets may be repaired in the same order, in accordance with various embodiments.

In various embodiments, the repair process 400 further comprises machining the lip of each pocket in the plurality of pockets (step 408). In various embodiments, the lip of each pocket in the plurality of pockets may be machined based on the measured depth from step 406. In this regard, only case material up to a depth of a respective wear portion for a specific pocket may be removed. In this regard, the repair process 400 may prevent excess case material from being removed (i.e., if lip were machined to a predetermined depth as opposed to a measured depth), in accordance with various embodiments.

In various embodiments, the repair process 400 may further comprise an inspection of the case (step 410). In various embodiments, an inspection may ensure that the lip of each pocket in the plurality of pockets is removed to a sufficient depth (i.e. at or past the measured depth).

Figure 5:
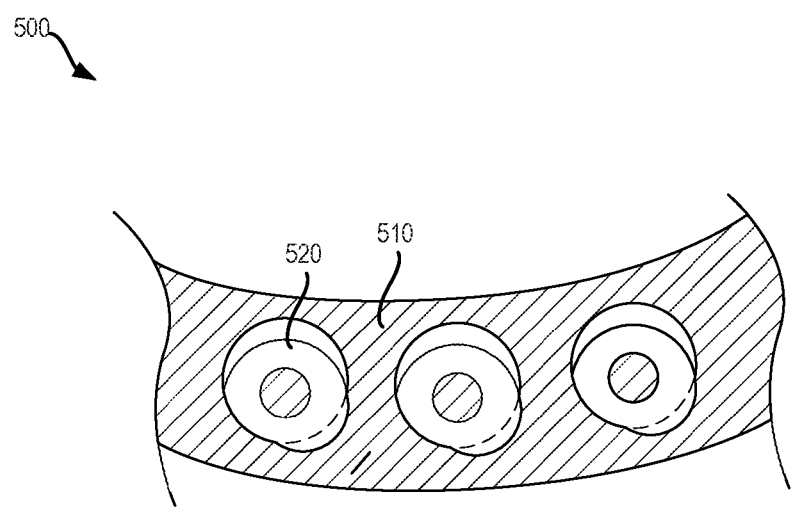
FIG. 5 illustrates a prepared portion of a repaired case for a variable stator, in accordance with various embodiments.

In various embodiments, the repair process 400 further comprises masking a portion of the case (step 412). With brief reference to FIG. 5, a compressor case 500 with a masked portion 510 (shown with cross-hatching) and an un-masked portion 520 is illustrated. With combined reference to FIGS. 3B and 5, the masked portion 510 may include the aperture 322 of each pocket in the plurality of stator pockets 320 and the gas path surface 312, and the un-masked portion may include the pocket recess 324, the pocket sidewall 326 and the wear portion 328 of each pocket in the plurality of stator pockets 320. In various embodiments, masking the portion of the case may include ultraviolet (UV) masking, hard masking, or the like.

In various embodiments, the repair process 400 further comprises grit blasting the unmasked portion of the case (step 414). In various embodiments, the unmasked portion may be prepared to receive a spray coating in response to the grit blasting.

In various embodiments, the repair process 400 further comprises spraying a coating into the wear portion of each pocket in the plurality of pockets (step 416). In various embodiments, spraying the coating may comprise depositing a first layer in each pocket in the plurality of pockets, followed by depositing a second layer in each pocket in the plurality of pockets until a height of each pocket in the plurality of pockets is equal to or greater than the measured depth of each respective pocket in the plurality of pockets from step 406. In various embodiments, the coating may comprise a nickel-aluminum plasma, a molybdenum-nickel-aluminum plasma, aluminum-graphite composite plasma, or the like. In various embodiments, the coating comprises nickel-aluminum plasma. In this regard, the thickness of the coating to be applied may not be limited, and the coating may include additional bonding ability compared to other spray coatings. In various embodiments, spraying the coating of step 416 may be performed via a double-wire feed and plasma arc additive manufacturing process (DFW-PAM).

In various embodiments, the repair process further comprises removing the masking (step 418), a final machining (step 420), and a visual and dimensional inspection (step 422). The final machining and visual inspection may ensure the case is within predetermined tolerances of an original geometric tolerance of the originally manufactured case, in accordance with various embodiments.

Figure 6:
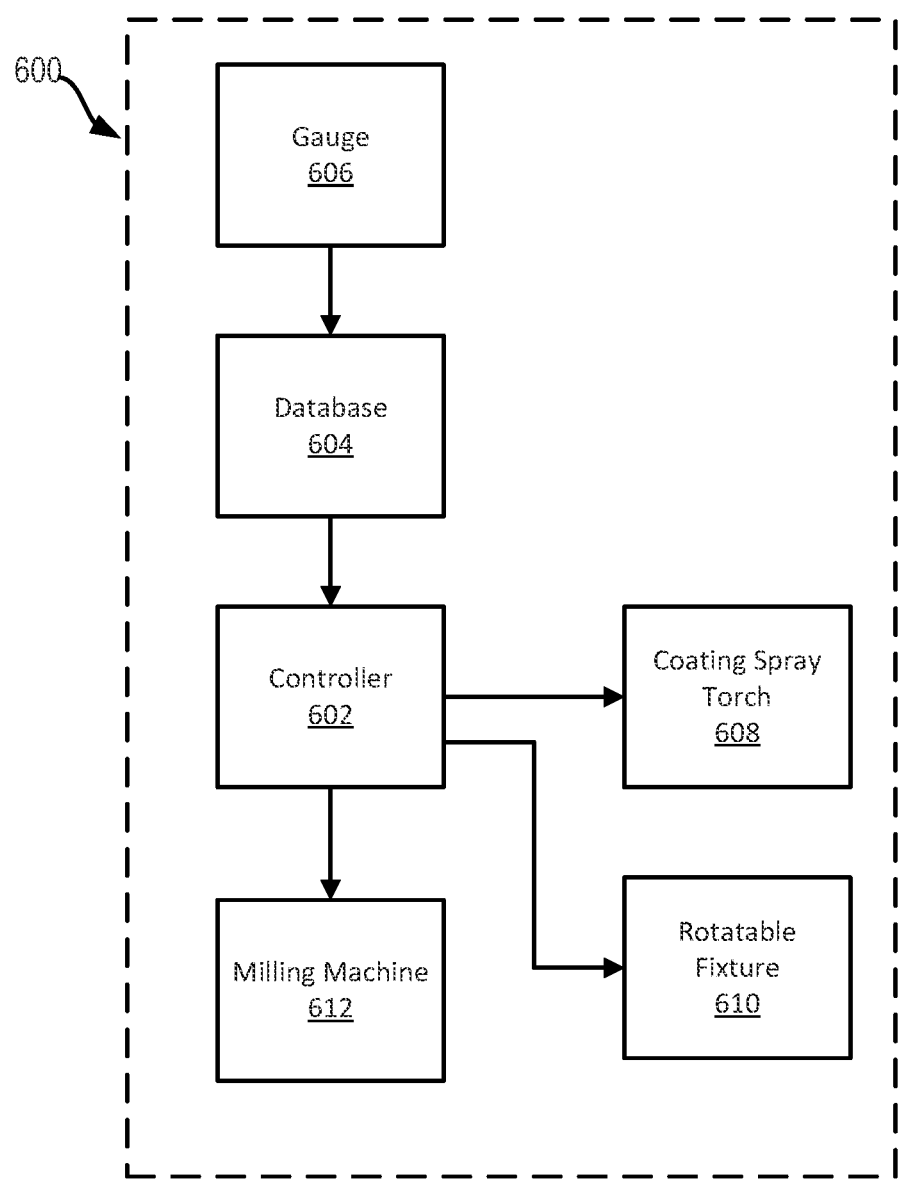
FIG. 6 illustrates a control system for a repair process of a variable stator, in accordance with various embodiments.

Referring now to FIG. 6, a control system 600 for repairing a wear portion of each pocket in a plurality of pockets of a case (e.g., compressor case 310 from FIGS. 3B-C), in accordance with various embodiments. The control system 600 includes a controller 602 and a database 604. The controller 602 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 602 may further include any non-transitory memory known in the art. The memory may store instructions usable by the logic device to perform operations.

The control system 600 may further include a database or remote memory 604. The database 604 integral to the control system 600 or may be located remote from the control system 600. The controller 602 may communicate with the database 604 via any wired or wireless protocol. In that regard, the controller 602 may access data stored in the database 604. The database 604 may be configured to receive wear depths of a wear portion for each pocket in a plurality of pockets of a case (e.g., compressor case 310 from FIGS. 3A-B) from a gauge 606. The gauge 606 may be configured to measure a wear depth of a wear portion of a pocket as described previously herein.

In various embodiments, the control system 600 may comprise a milling machine 612. In this regard, the controller 602 may command the milling machine to mill a lip of a pocket in the plurality of pockets (e.g., the lip 354 from FIG. 3C) to a predetermined depth. In various embodiment the predetermined depth may be measured, as previously disclosed herein, or the predetermined depth may be determined any other way in the art, such as pre-setting a milling depth based on a maximum depth of a wear portion in the plurality of pockets. In various embodiments, the milling machine 612 may be integral with the control system 600 or a separate component. In various embodiments, milling may be performed manually, and the control system 600 may be for spraying step 416 from repair process 400 in FIG. 4 only.

In various embodiments, the control system 600 may further comprise a coating spray torch 608 and a rotatable fixture 610. The rotatable fixture 610 may be configured to rotate relative to the coating spray torch 608. The coating spray torch may be aligned with wear portion of a pocket disposed in a flow path surface of a case to be repaired (e.g., wear portion 328 from FIG. 3C).

In various embodiments, the wear depths may be measured manually and manually input into the database 604. In various embodiments, the database 604 may store a location of each pocket in the plurality of pockets relative to a location of the rotatable fixture 610. In this regard, the controller 602 may command the rotatable structure to a first position. The first position may align the coating spray torch with a wear portion of a pocket in the plurality of pockets (e.g., wear portion 328 from FIGS. 3B-C). In various embodiments, the controller 602 may determine a total thickness to be deposited in the wear portion based on the first location and a stored depth for the wear portion. In various embodiments, the stored depth may be a measured depth (e.g., from gauge 606), or a depth inputted into the database 604. The controller 602 may then command the coating spray torch 608 to deposit a first layer in the wear portion and repeat the process for a next wear portion of an adjacent pocket in the plurality of pockets. The controller 602 may then rotate the rotatable fixture 610 to align the coating spray torch 608 to a second wear portion of the adjacent pocket in the plurality of pockets. The controller 602 may then repeat the determining the total thickness and depositing a first layer steps above.

In various embodiments, the controller 602 may repeat the process above until the wear portion of each pocket in the plurality of pockets is filled with the coating deposited from the coating spray torch 608. In various embodiments, by depositing the coating in layers, as opposed to all at once, the coating may form a stronger bond with the case, in accordance with various embodiments.

Figure 7:
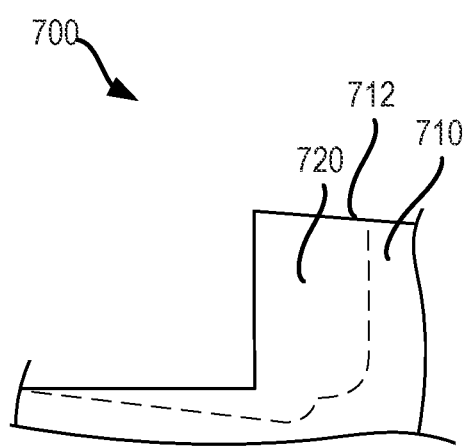
FIG. 7 illustrates a cross-sectional view of a repaired case, in accordance with various embodiments.

Referring now to FIG. 7, a repaired case 700 for a stator assembly (e.g., stator assembly 300) is illustrated, in accordance with various embodiments. In various embodiments, the repaired case 700 includes the case 710 (e.g., compressor case 310 from FIG. 3C without the lip 354) and a bonded coating 720. In various embodiments, the bonded coating 720 may be configured to define a portion of a repaired gas path surface 712.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for repairing a pocket of a case for a variable stator assembly, the method comprising:
    receiving, via a processor, a plurality of wear depths, each wear depth in the plurality of wear depths corresponding to a wear portion in a stator pocket in a plurality of stator pockets;
    determining, via the processor, a plurality of thicknesses of a coating to be deposited based on the plurality of wear depths, each thickness of the coating in the plurality of thicknesses corresponding to the wear portion for each stator pocket in the plurality of stator pockets; and
    commanding, via the processor, a coating spray torch to deposit the coating in the wear portion of each stator pocket in the plurality of stator pockets;
    commanding, via the processor, a milling machine to remove a lip at least partially defined by the wear portion of each pocket in the plurality of stator pockets prior to commanding the coating spray torch to deposit the coating, wherein commanding the milling machine to remove the lip further comprises machining the lip to a machined depth based on a respective depth in the plurality of wear depths for a respective stator pocket in the plurality of stator pockets.

2. The method of claim 1, wherein depositing the coating is performed in layers for the wear portion of each stator pocket in the plurality of stator pockets.

3. The method of claim 2, wherein commanding the coating spray torch to deposit the coating further comprises:
    commanding, via the processor, the coating spray torch to deposit a first layer of the coating in a first pocket in the plurality of stator pockets;
    commanding, via the processor, a rotatable fixture to rotate the case and align the coating spray torch with a second pocket in the plurality of stator pockets; and
    commanding, via the processor, the coating spray torch to deposit a second layer of the coating in the second pocket in the plurality of stator pockets.

4. The method of claim 1, wherein the plurality of wear depths are received through a gauge.

5. The method of claim 1, wherein the coating is a nickel-aluminum plasma coating.

6. The method of claim 1, wherein the wear portion of each stator pocket in the plurality of stator pockets includes a recess having an axial portion, a radial portion, and a circumferential portion relative to a centerline defined by an aperture through the stator pocket in the plurality of stator pockets.

7. A method for repairing a pocket of a case for a variable stator assembly, the method comprising:
    receiving, via a processor, a plurality of wear depths, each wear depth in the plurality of wear depths corresponding to a wear portion in a stator pocket in a plurality of stator pockets;
    determining, via the processor, a plurality of thicknesses of a coating to be deposited based on the plurality of wear depths, each thickness of the coating in the plurality of thicknesses corresponding to the wear portion for each stator pocket in the plurality of stator pockets; and
    commanding, via the processor, a coating spray torch to deposit the coating in the wear portion of each stator pocket in the plurality of stator pockets, wherein depositing the coating is performed in layers for the wear portion of each stator pocket in the plurality of stator pockets, and wherein commanding the coating spray torch to deposit the coating further comprises:
        commanding, via the processor, the coating spray torch to deposit a first layer of the coating in a first pocket in the plurality of stator pockets;
        commanding, via the processor, a rotatable fixture to rotate the case and align the coating spray torch with a second pocket in the plurality of stator pockets; and
        commanding, via the processor, the coating spray torch to deposit a second layer of the coating in the second pocket in the plurality of stator pockets.

* * * * *